United States Patent [19]

Colla et al.

[11] Patent Number: 5,737,444
[45] Date of Patent: Apr. 7, 1998

[54] BINARY DIGITAL IMAGE FEATURE EXTRACTING PROCESS

[75] Inventors: Anna Maria Colla, Piazza Verdi; Pietro Pedrazzi, Beato Martino, both of Italy

[73] Assignee: Ministero Dell 'Universita' E Della Ricerca Scientifica E Technologica, Italy

[21] Appl. No.: 782,831

[22] Filed: Jan. 13, 1997

Related U.S. Application Data

[63] Continuation of Ser. No. 447,093, May 22, 1995, abandoned.

[30] Foreign Application Priority Data

May 20, 1994 [IT] Italy ................... TO94A0411

[51] Int. Cl.$^6$ ................................................. G06K 9/00
[52] U.S. Cl. ................................. 382/190; 382/186
[58] Field of Search ........................... 382/205, 203, 382/218, 190, 192, 194, 195, 197, 199, 193, 287, 101, 102, 135, 137, 138, 161, 170, 177, 181, 185, 186, 187, 188, 191, 196, 198, 201, 202, 204, 207, 208, 209, 217, 224, 226, 229, 231, 286, 292, 293, 308, 156, 288

[56] References Cited

U.S. PATENT DOCUMENTS

| | | | |
|---|---|---|---|
| 4,497,066 | 1/1985 | Gasparri, Jr. .................. | 382/48 |
| 4,977,603 | 12/1990 | Irie et al. ....................... | 382/203 |
| 4,981,372 | 1/1991 | Morimoto et al. ............. | 382/203 |
| 5,001,766 | 3/1991 | Baird ............................. | 382/46 |
| 5,111,516 | 5/1992 | Nakano et al. ................ | 382/203 |
| 5,115,476 | 5/1992 | Ito ................................. | 382/203 |
| 5,151,950 | 9/1992 | Hullender ..................... | 382/203 |
| 5,184,732 | 2/1993 | Ditchburn .................... | 382/203 |

OTHER PUBLICATIONS

*Proceedings of the International Joint Conference On Neural Network (IJCNN)*, Jun. 7, 1992, Institute of Electrical Engineers, "Object Recognition Based on Projection", vol. 4, pp. 31–36. No Author. No Place of Publication.

*Proceedings 7th International Triennial World Conference Of IFAC*, Jun. 1978, "Pattern Recognition on the Basis of Similarity", pp. 909–916. No Author & Place of Publication.

*10th International Conference On Pattern Recognition*, Jun. 16, 1990, "An Effective Regional Descriptor and Its Application to Target Recognition", vol. 1, pp. 671–673. No Author.

*Proceedings of the Annual International Phoenix Conference On Computers and Communications*, Scottsdale, Mar. 27, 1991, "Parellelizing OCR", pp. 46–52. No Author.

Primary Examiner—Leo Boudreau
Assistant Examiner—Bijan Tadayon
Attorney, Agent, or Firm—Palmatier, Sjoquist, Helget & Voigt, P.A.

[57] ABSTRACT

A binary digital image feature extracting process whereby a number of elementary portions of predetermined shape are defined in a binary digital matrix; in each elementary portion, a number of analysis directions are defined at a predetermined angle in relation to the edges of the elementary portion; a number of paths are defined, each formed by an orderly set of pixels arranged at least approximately parallel to a respective analysis direction; for each path, the pixels presenting a predetermined characteristic definable by one or more whole numbers are determined; the numbers are converted by a nonlinear function to calculate a number of partial scores which are then grouped to give an overall score for each path; and the overall scores of the various paths are grouped according to the analysis direction to calculate a directional feature for each analysis direction.

21 Claims, 3 Drawing Sheets

BINARY DIGITAL IMAGE FEATURE EXTRACTING PROCESS

This application is a continuation of application Ser. No. 08/447,093 filed on May 22, 1995, now abandoned.

BACKGROUND OF THE INVENTION

The present invention relates to a binary digital image feature extracting process.

Artificial reading systems are known which comprise an image acquisition device (e.g. a television camera) for picking up the image of a set of characters (e.g. handwritten characters on a letter) to be read; a binary digitizer for digitizing the image of the characters; and a character recognition unit.

The character recognition unit is supplied with a binary matrix from the digitizer, and examines sets of points (pixels) in the matrix to determine—e.g. by means of mask recognition devices or statistical methods—the character or characters represented in the pixel set.

Character recognition units recently feature neural networks, in which application, two cascade devices are normally interposed between the digitizer and the character recognition unit.

The first device—known as a preprocessing unit—normally provides for segmenting the image into significant elements (e.g. word characters) and for reducing the image of each significant element to a predetermined size (normalization).

The second device—known as a feature extracting unit—processes the binary matrix of each significant element, and generates a vector of values (FEATURES) which are supplied to the character recognition unit.

The feature extracting unit is used to enhance recognition of the characters and to eliminate from the digitized image any information which is either irrelevant or might impair recognition.

Known feature extracting units employ highly complex mathematical calculating processes which are extremely difficult to implement.

SUMMARY OF THE INVENTION

It is an object of the present invention to provide a feature extracting unit employing a straightforward, effective calculating process.

According to the present invention, there is provided a binary digital image feature extracting process, characterized in that it comprises the steps of:

acquiring a binary digital matrix (M);

defining in said matrix (M) at least one elementary portion (F1, F2, . . . , Fi, . . . , FI) of predetermined shape;

selecting said elementary portion;

defining in said elementary portion at least one analysis direction (j(i));

defining within said elementary portion a number of paths K(i,j) parallel to said analysis direction (j(i));

each path being defined by an orderly set of pixels of said matrix (M) arranged at least approximately parallel to said analysis direction;

examining said paths to determine, for each path examined, the pixels presenting a predetermined characteristic, and to calculate at least one number (Ni,j,k,l) for each path examined;

calculating a score (Ti,j,k,l;Pi,j,k) by applying a function f(x) to said number (Ni,j,k,l); and grouping said scores (Ti,j,k,l;Pi,j,k) for said analysis direction (j(i)) to obtain a directional primitive feature (Si,j) for said analysis direction (j(i)).

BRIEF DESCRIPTION OF THE DRAWINGS

A preferred, non-limiting embodiment of the present invention will be described by way of example with reference to the accompanying drawings, in which.

DETAILED DESCRIPTION OF THE INVENTION

Figure 1:
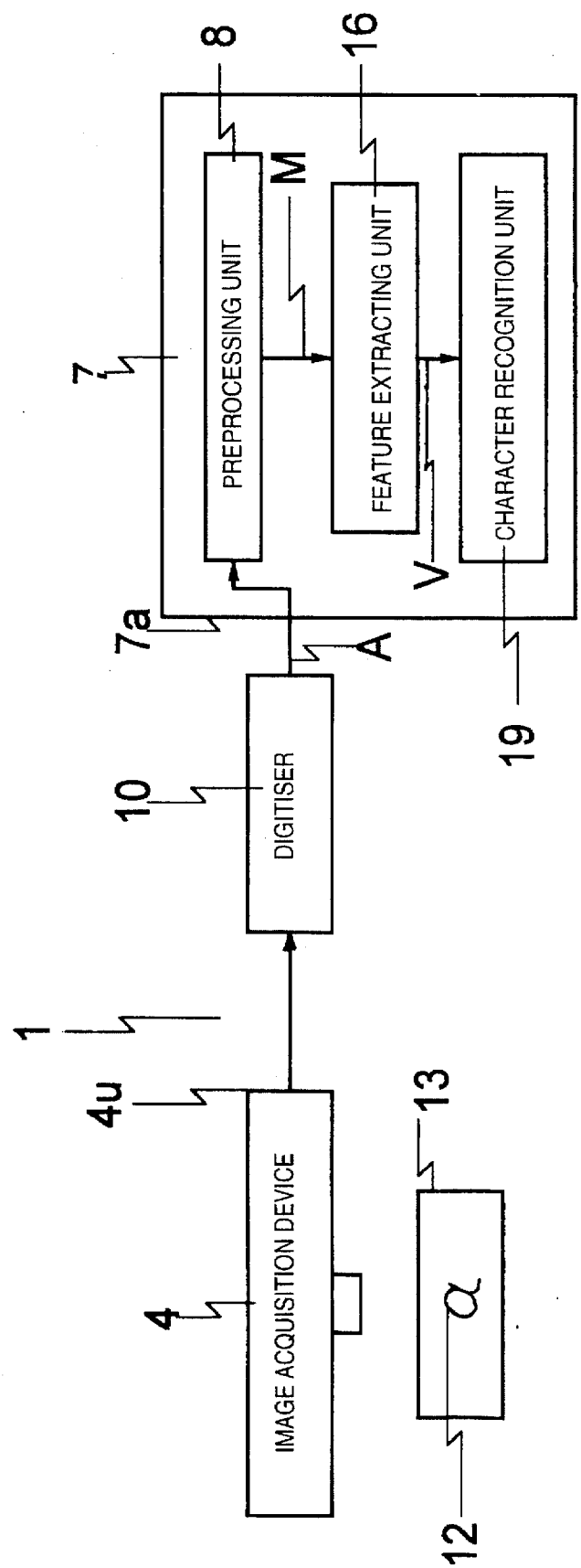
FIG. 1 shows, schematically, a character recognition device employing the feature extracting process according to the present invention.

Number 1 in FIG. 1 indicates a character recognition device comprising an image acquisition device 4; a processing device 7; and a digitizer 10 interposed between the output 4u of image acquisition device 4 and the input 7a of processing device 7.

Image acquisition device 4 provides for picking up a set of characters 12 impressed, e.g. handwritten, on an object 13, e.g. a mail item.

Digitizer 10 is supplied with and digitizes an analog image of characters 12 to generate a matrix A, which may be square or rectangular and comprises a number of pixels assuming a binary value (zero or one).

Characters 12 are conveniently impressed on a light (e.g. white) field, by means of a stroke darker than the field (e.g. blue or black), so that a first binary value (e.g. 1) of the pixels in matrix A corresponds to the stroke of characters 12 (significant pixels), and a second binary value (e.g. 0) of the pixels corresponds to the field (nonsignificant pixels).

Processing device 7 comprises a preprocessing unit 8 which is supplied with matrix A and generates one or more pixel matrixes M, each presumably containing a significant element—more specifically a character 12—for recognition; and each matrix M is supplied to a feature extracting unit 16 generating a feature vector V.

Feature vector V is supplied to a known character recognition unit 19, e.g. featuring neural networks.

Figure 2:
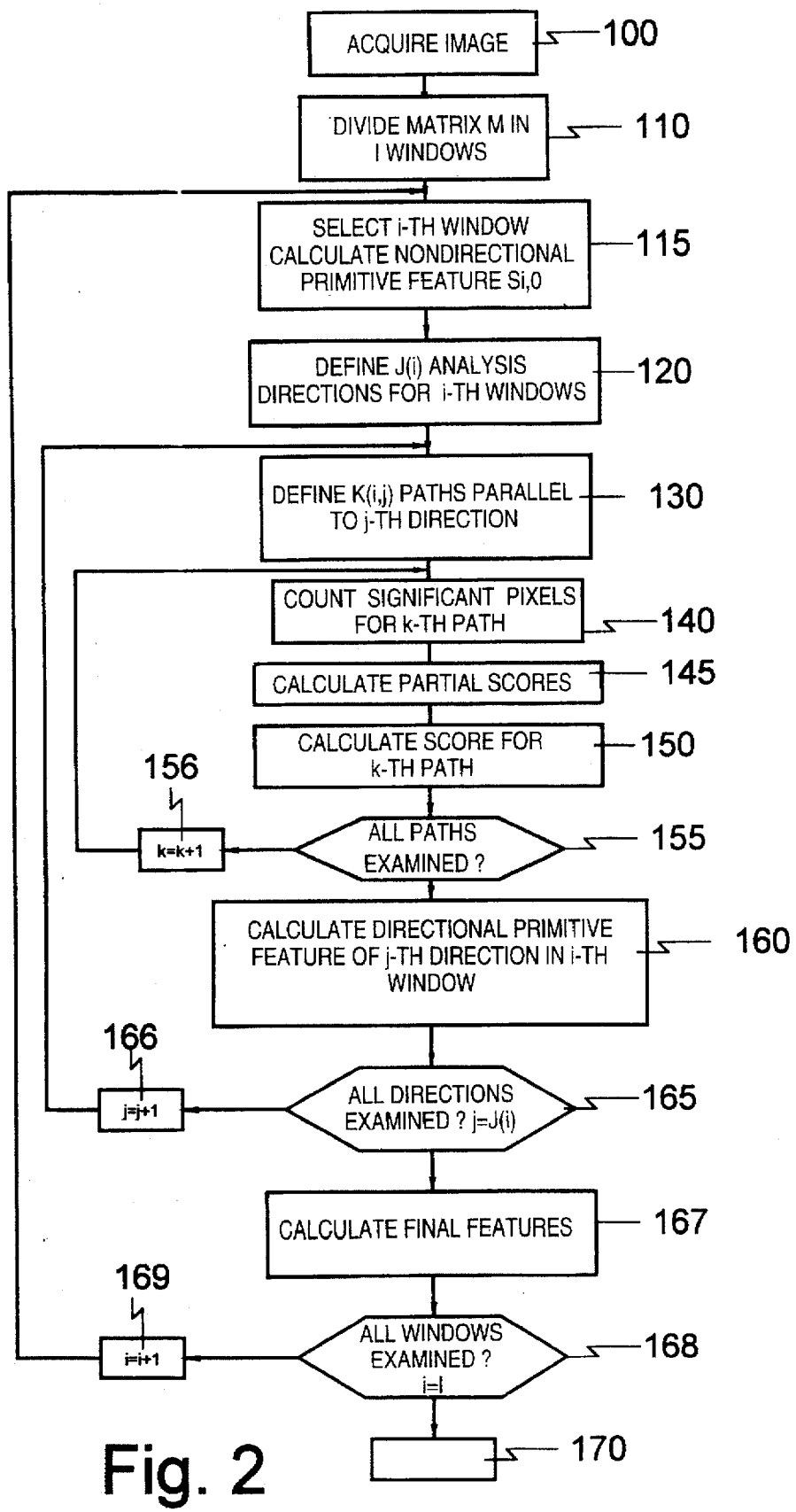
FIG. 2 shows a logic block diagram of the steps in the feature extracting process according to the present invention.

FIG. 2 shows a block diagram of the operations performed by feature extracting unit 16 according to the process of the present invention.

In the preferred embodiment described by way of example, said operations are shown in the form of steps performed sequentially, but which may of course also be performed wholly or partly in parallel.

To begin with, a block 100 provides for acquiring the image represented in matrix M.

Block 100 is followed by a block 110 which provides for dividing matrix M into a number of elementary portions F1, F2, . . . , Fi, . . . , FI called windows.

Each i-th window may be of a predetermined shape, e.g. square, rectangular, octagonal, etc., and the windows may differ in shape and size.

The windows may also be adjacent or overlap, and some windows may include others entirely.

Figure 3:
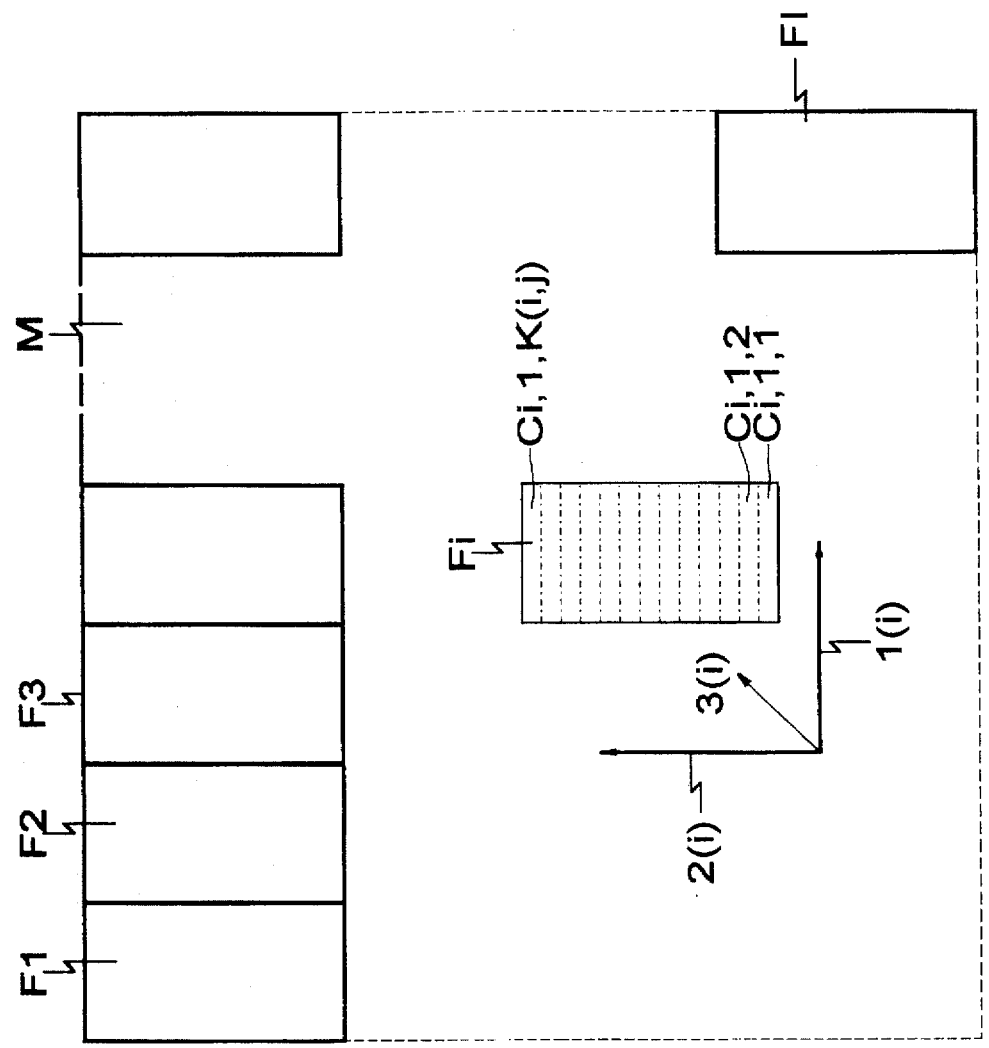
FIG. 3 shows a graphic representation of a number of steps performed in the process according to the present invention.

FIG. 3 shows a graphic representation of the operations performed by block 110.

In the example shown, matrix M is rectangular and divided into I identical, adjacent rectangular windows; and the index of the window is indicated with a variable i where i=1, ..., I.

Block 110 is followed by a block 115 which, on the basis of the value of variable i, selects a corresponding i-th window.

Block 115 also calculates a first nondirectional primitive feature $S_{i,0}$ consisting of the weighted sum of the pixels in the i-th window.

Bm being the numerical values (Bm=0,1) of the binary pixels in the i-th window, the nondirectional primitive feature is therefore defined according to the equation:

$$S_{i,0}=C1*B1+C2*B2+ \ldots +Cn*Bn \quad (1)$$

where C1, C2, ..., Cn are multiplication coefficients.

Coefficients C1, C2, ..., Cn may be so defined that the central pixels in the window contribute mostly towards defining nondirectional primitive feature $S_{i,0}$ as compared with the pixels along the edges of the window.

Block 115 is followed by a block 120 which, in the selected i-th window, defines J(i) analysis directions, each indicated by the letter j where j=1, ..., J(i). The analysis directions may be straight lines at any angle to the edges of window F, or curved lines.

In the FIG. 3 example, three analysis directions are defined: one horizontal 1(i) and parallel to two opposite edges of the window; one vertical 2(i) and perpendicular to direction 1(i); and one oblique 3(i) at an angle of 45° to directions 1(i) and 2(i).

Block 120 is followed by a block 130 in which K(i,j) paths are defined within the selected i-th window and in analysis direction j. A path is defined as an orderly set of pixels in the i-th window and arranged at least approximately parallel to the j-th analysis direction; and all the paths relative to the j-th analysis direction are approximately parallel to one another and may have certain pixels in common. The paths are indicated with the notation $C_{i,j,k}$, where k=1, ..., K(i,j).

All the paths together "cover" the window.

The FIG. 3 example shows the horizontal paths ($C_{i,1,k}$), i.e. parallel to horizontal analysis direction 1(i); which horizontal paths are in the form of parallel rectangles with their longer sides adjacent to one another.

Block 130 is followed by a block 140 which, on the basis of the value of variable k, selects a corresponding k-th path, and counts the pixels along path $C_{i,j,k}$ which present a predetermined characteristic.

For example, block 140 counts the total number of significant pixels along path $C_{i,j,k}$.

Alternatively, block 140 counts the length of the sets of contiguous significant pixels (black segments).

The output of block 140 is therefore one or more whole numbers $N_{i,j,k,l}$, where l=1, ..., L. Number L equals 1 when $N_{i,j,k,l}$ represents the total number of significant pixels, or may be greater than 1 depending on the sequence of significant and nonsignificant pixels forming path $C_{i,j,k}$.

Block 140 is followed by a block 145 which calculates a partial score $T_{i,j,k,l}$ by applying a nonlinear function f(x) to each number $N_{i,j,k,l}$ calculated in block 140, i.e.:

$$T_{i,j,k,l}=f(N_{i,j,k,l}) \quad (2)$$

The nonlinear function f(x) may be an exponential function of the type:

$$f(x)=0 \text{ where } x<xmin \quad (3)$$

$$f(x)=2^{(x-xmin)} \text{ where } x>xmin$$

Block 145 is followed by a block 150 which, from the partial scores $T_{i,j,k,l}$ calculated in block 145, determines a single overall score $P_{i,j,k}$ for each path $C_{i,j,k}$.

The overall score $P_{i,j,k}$ may be determined by adding the partial scores $T_{i,j,k,l}$ according to index l, or by selecting the highest partial score, again according to index l.

Block 150 is followed by a block 155 which determines whether all the K(i,j) paths in the currently selected direction j have been examined. If they have not, block 155 goes on to block 156 which increases variable k by one unit, i.e. k=k+1, and then goes back to block 140 which calculates the scores of another k-th path. Conversely, if all the scores in direction j have been calculated, block 155 goes on to block 160.

In block 160, the various scores $P_{i,j,k}$ calculated in the selected direction j are grouped together to give a single significant value or directional primitive feature in the selected direction j and the i-th window.

For this purpose, the scores in the selected direction j may be added together to give the directional primitive feature in that direction, i.e.:

$$S_{i,j}=a1,P_{i}*j,1*a2*P_{i,j},2+ \ldots +an*P_{i,j,K(i,j)}. \quad (4)$$

where a1, a2, ..., an are multiplication coefficients other than zero.

Alternatively, the directional primitive feature $S_{i,j}$ may be calculated, for each j-th direction, by examining pairs of overlapping paths, and taking and adding together the highest scores in the pairs in order to calculate the directional primitive feature $S_{i,j}$.

The directional primitive feature $S_{i,j}$ may also be calculated, for each j-th direction, by examining a first number of separate paths, and adding the scores of said first paths to calculate a first intermediate score.

Subsequently or simultaneously, a second number of separate paths overlapping those in the first number are examined, the scores of the second paths are added to give a second intermediate score, and the highest of the first and second intermediate scores is taken to calculate the directional primitive feature $S_{i,j}$.

Block 160 is followed by a block 165 which determines whether all the directions j (i.e. j=J(i)) in the currently selected i-th window have been examined. if they have not (j<J(i)), block 165 goes on to block 166 which increases the current j value by one unit (j=j+1) to select another direction j, and then goes back to block 130 which selects the paths for the next direction j. Conversely, if all the directions j in the selected window have been examined (j=J(i)), block 165 goes on to block 167.

In block 167, the j directional and nondirectional primitive features calculated for the i-th window are combined to give a set of final features $F_{i,n}$, where n=1, ..., N(i), by means of predetermined functions $G_{i,n}$, i.e.:

$$F_{i,n}=G_{i,n}(S_{i,0}, S_{i,1}, \ldots, S_{i,J}) \quad (5)$$

In general, N(i) is other than J(i)+1.

For example, to define function $G_{i,n}$, the directional primitive features may be multiplied by a coefficient depending on the nondirectional primitive feature $S_{i,0}$, or the final feature $F_{i,n}$ may be calculated as the difference between or the ratio of two primitive features calculated in two perpendicular directions.

Block 167 is followed by a block 168 which determines whether all the windows in the matrix have been examined (i.e. i=I). If they have not (i<I), block 168 goes on to block 169 which increases the current variable i by one unit (i=i+1) to select the next window.

Block 169 then goes back to blocks 115 and 120, which respectively provide for calculating the nondirectional primitive feature, and for selecting the directions j(i) of the newly selected window i. Conversely, if all the windows in matrix M have been examined (i=I), block 168 goes on to block 170.

Block 170 groups all the final features calculated in all the windows I and which form the feature vector V of matrix M, which vector V is then transferred to character recognition unit 19.

The advantages, as compared with known processes, of the feature extracting process according to the present invention will be clear from the foregoing description.

The process according to the present invention provides for fast, troublefree implementation; employs straightforward algorithms permitting excellent character recognition; and may be implemented physically using straightforward circuits. For example, the operations in (2) and (3) may be implemented using silicon devices comprising known, low-cost analog or digital circuits (e.g. adders, multipliers, current mirrors, etc.).

Clearly, changes may be made to the process as described and illustrated herein without, however, departing from the scope of the present invention.

We claim:

1. A binary digital image feature extracting process, characterized in that it comprises the steps of:
   acquiring (100) a binary digital matrix (M) of pixels;
   defining (110) in said matrix (M) at least one elementary portion (F1, F2, ..., Fi, ..., FI) of predetermined shape;
   selecting (115) said at least one elementary portion;
   defining (120) in said at least one elementary portion at least one analysis direction (j(i));
   defining (130) within said at least one elementary portion a number of paths K(i, j) parallel to said analysis direction (j(i));
   each path being defined by an orderly set of pixels of said matrix (M) arranged approximately parallel to said at least one analysis direction;
   examining (140, 155, 156) said paths to determine, for each path examined, the pixels presenting a predetermined characteristic, and to calculate, based on said predetermined characteristic, at least one number (Ni, j, k, l) for each path examined;
   calculating (145, 150) a score (Ti, j, k, l; Pi, j, k) for each path by applying a function f(x) to said number (Ni, j, k, l); and
   grouping (160) said scores (Ti, j, k, l; Pi, j, k) for said at least one analysis direction (j(i)) to obtain a directional primitive feature (Si, j) for said analysis direction (j(i)).

2. A process as claimed in claim 1 characterized in that the examining step (100, 155, 156) also comprises the step of calculating at least a further number (Ni, j, k, l) for each path examined; and in that
   said step (145, 150) of calculating a score (Pi, j, k) comprises the step of applying a function f(x) to said numbers (Ni, j, k, l) to calculate a number of partial scores (Ti, j, k, l), and grouping said partial scores (Ti, j, k, l) to obtain said scores (Pi, j, k).

3. A process as claimed in claim 2, characterized in that said step of grouping said partial scores (Ti,j,k,l) comprises the step of adding said partial scores (Ti,j,k,l).

4. A process as claimed in claim 2, characterized in that said step of grouping said partial scores (Ti,j,k,l) comprises the step of selecting the highest of said partial scores.

5. A process as claimed in claim 1, characterized in that said step of defining (120) in said at least one elementary portion at least one analysis direction (j(i)) comprises the step of defining a number of analysis directions at a predetermined angle in relation to the edges of said at least one elementary portion;
   said process further comprising the step of selecting (165, 166) said at least one analysis directions and calculating a respective directional primitive feature for each selected direction.

6. A process as claimed in claim 1, characterized in that said step of grouping (160) said scores (Pi,j,k) for said analysis direction (j(i)) comprises the step of adding the scores of the various paths.

7. A process as claimed in claim 1, characterized in that said step of grouping (160) said scores comprises the steps of:
   examining pairs of overlapping paths;
   selecting the highest score in each pair of overlapping paths; and
   adding said highest scores to calculate said directional primitive feature (Si,j).

8. A process as claimed in claim 1, characterized in that said step of grouping (160) said scores comprises the steps of:
   examining a first number of first separate paths;
   adding the scores of said first paths to calculate a first intermediate score;
   examining a second number of second separate paths overlapping the paths in said first number;
   adding the scores of said second paths to calculate a second intermediate score; and
   selecting the highest of said first and second intermediate scores to calculate said directional primitive feature (Si,j).

9. A process as claimed in claim 1, characterized in that it comprises the step of calculating (115) a nondirectional primitive feature (Si,O) consisting of the weighted sum of the pixels in the i-th window.

10. A process as claimed in claim 9, characterized in that it comprises the step of grouping (167) said directional primitive feature (Si, j) calculated in the i-th elementary portion and said nondirectional primitive feature (Si, O) to obtain at least one final feature (Fi, n).

11. A process as claimed in claim 10, characterized in that said step of grouping (167) said directional primitive features (Si, j) and said nondirectional primitive feature (Si, O) comprises the step of multiplying (167) said directional primitive features (Si, j) by a coefficient depending on said nondirectional primitive feature (Si, O).

12. A process as claimed in claim 10, characterized in that said step of grouping (167) said directional primitive features (Si, j) and said nondirectional primitive features (Si, O) comprises the step of calculating (167) a function selected from the group consisting of the difference between two directional primitive features calculated in two perpendicular directions and the ratio of two directional primitive features calculated in two perpendicular directions.

13. A process as claimed in claim 1, characterized in that said step of defining in said matrix at least one elementary portion (F1, F2, ..., Fi, ..., FI) of predetermined shape comprises the step of dividing (110) said matrix (M) into a number of elementary portions (F1, F2, ..., Fi, ..., FI) of predetermined shape;

said process further comprising the step of selecting (168, 169) said at least one elementary portions, and calculating, for each selected elementary portions, at least one directional primitive feature.

14. A process as claimed in claim 1, characterized in that said at least one elementary portions are rectangular.

15. A process as claimed in claim 1, characterized in that said at least one analysis direction is a straight line.

16. A process as claimed in claim 1, characterized in that said at least one analysis direction is a curved line.

17. A process as claimed in claim 1, characterized in that said function (f(x)) is a nonlinear function.

18. A process as claimed in claim 17, characterized in that said nonlinear function f(x) is defined as:

$$f(x)=0 \text{ where } x<x\min$$

$$f(x)=2^{(x-x\min)} \text{ where } x>x\min.$$

19. A process as claimed in claim 1, characterized in that said step of examining (140, 155, 156) said paths to determine the pixels presenting a predetermined characteristic comprises the step of determining, for each path examined, the number of pixels presenting a predetermined binary value.

20. A process as claimed in claim 1, characterized in that said step of examining (140, 155, 156) said paths to determine the pixels presenting a predetermined characteristic comprises the step of determining, for each path examined, sets of adjacent pixels presenting the same predetermined binary value.

21. A binary digital image feature extracting device, characterized in that it comprises:

acquisition means (100) for acquiring a binary digital matrix (M) of pixels;

first defining means (110) for defining in said matrix (M) a number of elementary portions (F1, F2, ..., Fi, ..., FI) of predetermined shape;

selecting means (115) for selecting said at least one elementary portions;

second defining means (120) for defining at least one analysis direction (j(i)) in a selected elementary portion;

third defining means (130) for defining within said selected elementary portions a number of paths K(i, j) parallel to said at least one analysis direction (j(i));

each path being defined by an orderly set of pixels of said matrix (M) arranged approximately parallel to said at least one analysis direction;

analyzing means (140, 155, 156) for examining said paths to determine, for each path examined, the pixels presenting a predetermined characteristic, and to calculate at least one whole number (Ni, j, k, l) for each path examined;

algebraic calculating means (145, 150) for calculating a score (Pi, j, k) by applying a function f(x) to said at least one whole number (Ni, j, k, l); and processing means (160) for grouping said scores (Pi, j, k) for said at least one analysis direction (j) to obtain a directional primitive feature for said at least one analysis direction.

* * * * *